United States Patent [19]

Meier

[11] Patent Number: 5,435,195
[45] Date of Patent: Jul. 25, 1995

[54] PLANAR SINGLE-PIECE MEASURING STRING WITH TWO NODES FOR THE MEASUREMENT OF LINEAR DISPLACEMENTS OR FORCES

[75] Inventor: Eugen Meier, Meilen, Switzerland

[73] Assignee: Mettler-Toledo AG, Greifensee, Switzerland

[21] Appl. No.: 258,424

[22] Filed: Jun. 10, 1994

[30] Foreign Application Priority Data

Aug. 20, 1993 [CH] Switzerland ............... 2490/93

[51] Int. Cl.⁶ ............................................. G01L 1/10
[52] U.S. Cl. ................................. 73/862.59; 73/778; 73/DIG. 1; 177/210 R
[58] Field of Search ............ 73/862.59, 778, DIG. 1, 73/580, 817 AV; 177/210, DIG. 11

[56] References Cited

U.S. PATENT DOCUMENTS

| | | | |
|---|---|---|---|
| 3,470,400 | 9/1969 | Weisbord | 310/15 |
| 4,378,702 | 4/1983 | Meier | 73/862.59 X |
| 4,420,984 | 12/1983 | Zuilinger | 73/DIG. 1 |
| 4,503,715 | 3/1985 | Greenwood | 73/862.59 |

FOREIGN PATENT DOCUMENTS

| | | |
|---|---|---|
| 0030741 | 6/1981 | European Pat. Off. |
| 3709096 | 9/1987 | Germany |
| 648663 | 3/1985 | Switzerland |
| 9310428 | 5/1993 | WIPO |

*Primary Examiner*—Richard E. Chilcot, Jr.
*Assistant Examiner*—Elizabeth L. Dougherty
*Attorney, Agent, or Firm*—Friedrich Kueffner

[57] ABSTRACT

A planar single-piece measuring string which is designed to oscillate transversely to the plane defining its rest position has two attachment tabs, a resonating string section, two coupling sections connecting the resonating string section to the attachment tabs, and two defined nodal domains where the resonating string section meets the coupling sections. The measuring string includes at each nodal domain a pair of elastic flaps. The elastic flaps extend parallel to the resonating section and participate in the oscillation of the string. The elastic flaps are connected on one side thereof to the nodal domains and the free ends of the flaps are located at a distance opposite each other. The flaps have the same thickness as the other portions of the measuring string.

16 Claims, 3 Drawing Sheets

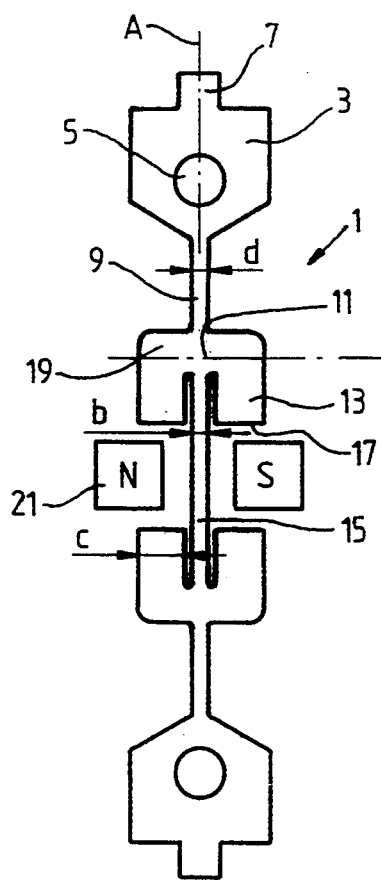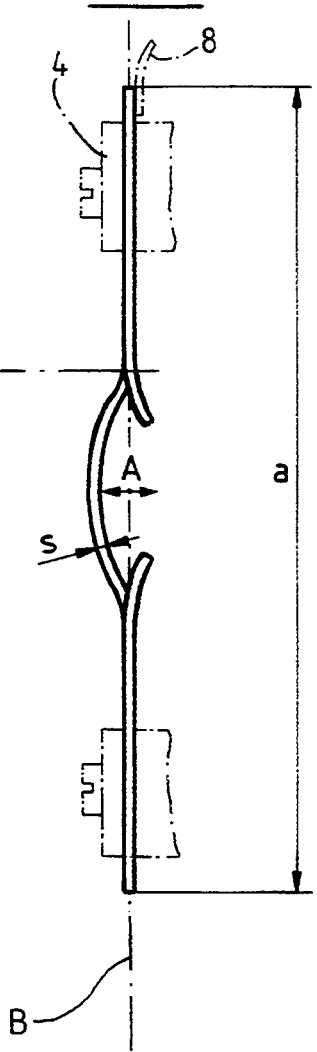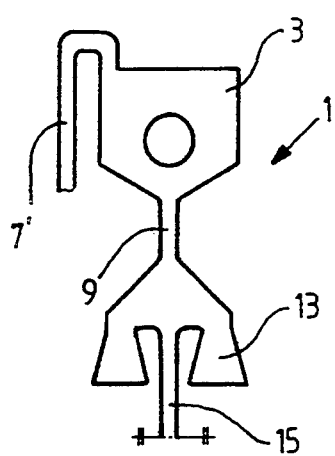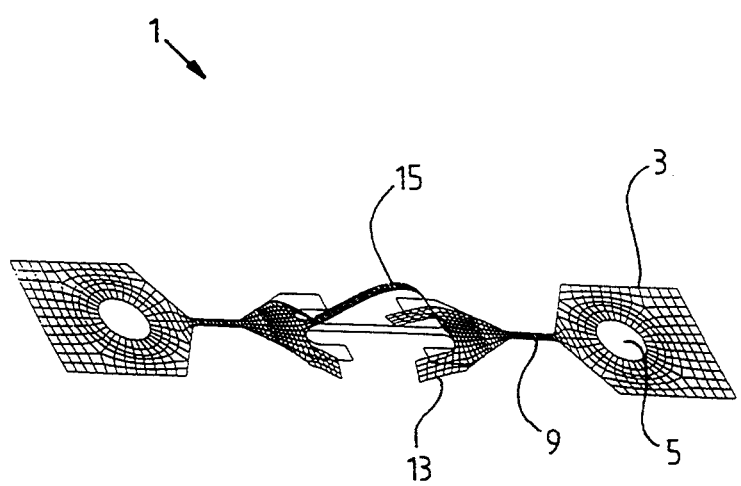

PLANAR SINGLE-PIECE MEASURING STRING WITH TWO NODES FOR THE MEASUREMENT OF LINEAR DISPLACEMENTS OR FORCES

BACKGROUND OF THE INVENTION

1. Field of the Invention

The present invention relates to a planar single-piece measuring string which is designed to oscillate transversely to the plane defining its rest position and which has two attachment tabs, a resonating string section, two coupling sections connecting the resonating string section to the attachment tabs, and two defined nodal domains where the resonating string section meets the coupling sections.

2. Description of the Related Art

One of the uses of measuring strings of the above-described type is in weighing scales. The measuring string, clamped fast at its ends, is sustained in transverse oscillations whose frequency will vary depending on the weighing load. These frequency variations, processed by appropriate electronic means, serve to determine the force acting on the string at a particular moment.

Previously known from CH-A-648663 is a planar measuring string which is clamped fixedly at both ends of the string. At the transition from the mid-portion, where the actual resonating string section carries out the oscillatory motion, to the coupling sections that adjoin the clamped areas, there are two pairs of flaps oriented at a right angle to the resonating string section and the coupling sections. The four flaps, in order to increase their inertial mass, have supplemental masses attached to them. The two pairs of flaps together with the attached supplemental masses, due to their inertia, form the two nodal points that define the resonating string section therebetween. These nodal masses, being large in relation to the mass of the resonating string section, effectively uncouple the resonating string section from the adjoining parts, i.e., from the clamped portions of the measuring string at both of its ends.

The manufacture of this kind of measuring string is very demanding, considering the extreme accuracy required in producing the stamped sheet-metal parts as well as the supplemental masses that are to be added to the flaps and which, furthermore, have to be joined to the flaps by cementing, soldering or welding. Since the supplemental masses are large in relation to the mass of the resonating string section, this apparatus will work only in a vertical orientation.

From EP-A2-0030741 there is further known an arrangement for isolating the oscillations of a measuring string. This string, again, has two ends configured for its attachment, the actual resonating string section being clamped fixedly between the ends. Disclosed are means, located between the attachment ends and the ends of the clamped resonating string section which oscillates transversely relative to the clamped flat portions, for uncoupling the oscillations caused by the resonating string section. These isolation means include elastic cross-pieces positioned transversally relative to the resonating string section. On the two intermediately positioned transverse cross-pieces which are connected with the ends of the resonating string section, isolating masses are mounted that run parallel to the string. These isolating masses have a resonance frequency that is lower than the frequency of the resonating string section, thereby providing effective isolation between the oscillation of the string and its terminating attachments. The isolating masses, being large in relation to the mass of the resonating string section while having a lower oscillating frequency, prevent the propagation of transverse vibrations into adjacent portions of the apparatus.

From International Patent Application WO 93/10428 there is further known a measuring string which is held clamped at its ends by ring-shaped clamping means. At the mid-point of the resonating string section that extends between the two clamping means, H-shaped weights are attached for the purpose of preventing interference frequencies. In the sections between the supplemental mass at the mid-point of the string and the clamped portions, there are electrical transmitters designed to energize the resonating string section into oscillation. The nodes of the resonating string section are located at the ends of the string near the clamp terminals. In parallel with the resonating string section there may be additional material connections between the clamp terminals for reducing the force acting on the resonating string section. In proportion to their cross-sectional strength they will take up a more or less important share of the tensile force acting between the two clamp terminals and thereby reduce the tensile force acting on the resonating string section. In this known configuration of a measuring string, likewise, there is no positive isolation of the oscillations of the resonating string section from the clamp terminals.

From DE-A1-3709096 there is further known a resonator for the measurement of acceleration of bodies in flight. The resonator includes an oscillating member arranged between two fastening elements, wherein the member oscillates in a plane containing its longitudinal axis and, to isolate it from the fastening elements, is provided at each end with an isolating mass that is connected to the fastening element nearest to it by a pair of isolating springs. Each pair of isolating springs converges or diverges from the isolating mass, wherein the pairs of isolating springs are oriented respectively perpendicular to a line of motion that intersects the location where the isolating spring is connected to the isolating mass, the line of motion representing the direction of the reactive shear force and the reactive moment that exists at the termination of the oscillating member nearest to the respective pair of isolation springs. This known resonator oscillates in the plane that contains the oscillating rod member as well as the isolating masses, the latter being respectively configured in pairs. Uncoupling of the oscillations from the fastening elements is, at best, very difficult to maintain over an extended frequency range.

SUMMARY OF THE INVENTION

Therefore, it is the primary object of the present invention to provide a planar, single-piece measuring string that is cost-effective to manufacture and offers the potential of optimized isolation of the string oscillations from adjoining portions of the apparatus, resulting accordingly in high oscillator quality.

In accordance with the present invention, the above object is met by a planar single-piece measuring string which includes at each nodal domain a pair of elastic flaps. The elastic flaps extend parallel to the resonating section and participate in the oscillation of the string. The elastic flaps are connected on one side thereof to the nodal domains and the free ends of the flaps are located at a distance opposite each other. The flaps have the same thickness as the other portions of the measuring string.

The elastic flaps, whose root portions are located in line with the root portion of the resonating string section, provide the possibility for perfect compensation of the transverse forces and moments that are introduced from the resonating string section into the coupling sections, which has the effect of placing the nodes in the connecting portions between the resonating string section and the coupling sections. As the resonating string section and the elastic flaps are oscillating in opposite phase in the plane of minimal flexural rigidity, this further makes it possible to design the measuring string in its entirety so as to have a very small mass, meaning, e.g., to manufacture it from thin-foil sheet metal or other materials, which makes the measuring string indifferent to the orientation at which it is positioned in the measuring instrument. The larger specific mass (mass per unit of length) of the flaps is achieved simply and cost-effectively by making the flaps wider than the width of the resonating string section, the thickness being the same in both of the two elements.

In a preferred embodiment the ratio of the width of the elastic flaps in relation to the width of the string is, e.g., 2 to 1.

A preferably triangular configuration of the nodal domain permits the connections to the two flaps and to one end of the resonating string section to be in a line perpendicular to the resonating string section, and the connection to the coupling section to be at a place exactly symmetrical to the connecting portions of the elastic flaps and the resonating string section.

The elastic flaps may be shaped so as to adapt their oscillatory properties to the respective requirements. Shaping the section between the attachment tab and the resonating string section so as to make it function as a spring offers the possibility to reduce or limit the amount of force acting on the string at a given amount of deflection. This permits the miniaturization of the entire measuring string arrangement.

Forming the spring by incorporating a slit in the attachment tabs makes it possible to produce measuring strings of very short length and small mass. With the placement of the spring within the coupling section, a greater reduction of the force on the string can be achieved. Ring-shaped or wave-shaped springs incorporated in the coupling section serve, on the one hand, to reduce the force acting on the resonating string section—in parallel spring systems, that is—and, on the other hand, they serve as additional isolators in case any oscillations get past the nodal points.

Since the springs are of the nature of articulated members, it is further possible to incorporate the measuring string in parallel with the kinematic plane of flexible parallel-motion linkages. This constructive latitude results in particularly simple design constraints on incorporating the measuring string at the center of flexible parallel-motion cell mechanisms of the type used in balances.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a front view of a planar measuring string;

FIG. 2 is a side view of the string of FIG. 1, seen in oscillation;

FIG. 3 is a front view of an alternative embodiment of the measuring string with divergent elastic flaps;

FIG. 4 is a perspective view of the measuring string of FIG. 3 with deflections, amplitudes of the string and of the flaps shown in exaggerated proportion;

DETAILED DESCRIPTION OF THE PREFERRED EMBODIMENTS

Figure 5:
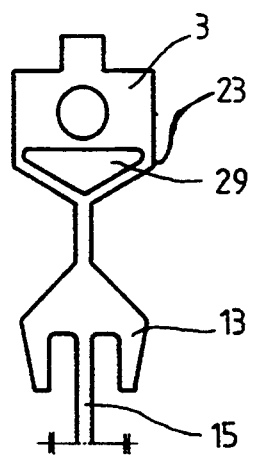
FIGS. 5 to 7 show further embodiments of the measuring string with a spring integrated into the attachment tab.

A planar measuring string 1, preferably made of thin sheet metal, has at each end an attachment tab 3 with a hole 5 provided for the attachment of string 1 between two clamping means 4 in a measuring instrument, such as a balance, not shown. The attachment tabs 3 include projecting tabs or wires 7 provided for the electrical connections to a generator that sustains the oscillation. The contacting or connecting element may also be incorporated into the clamping means 4, or it may be configured as a slender conductor 7′ that extends parallel to the measuring string 1 (FIG. 3). Between the two oppositely positioned and symmetrically configured attachment tabs 3 are formed two coupling sections 9 in the shape of necks of significantly narrower width than the attachment tabs 3. The two coupling sections 9 are also arranged symmetrically.

Located at the respective ends of coupling sections 9 that face each other and on the far sides from the attachment tabs 3, are root portions 11 of pairs of elastic flaps 13 and of a resonating string section 15, wherein the string section 15 has approximately the same width as and extends in line with the coupling sections 9. In their rest position, i.e., in an inert state, elastic flaps 13 and resonating string section 15 lie in a common plane B (the drawing plane of FIG. 1). The elastic flaps 13 extend parallel to and with a narrow lateral separation from resonating string section 15. The free ends 17 of flaps 13 are spaced opposite from each other. The length of elastic flaps 13 is significantly less than half the length of resonating string section 15. The flaps 13 may be shaped rectangularly or, as in FIG. 3, trapezoidally diverging from the root portion. As is self-evident, variant shapes may be substituted. The root portions 11 of elastic flaps 13 and the juncture of resonating string section 15 with coupling section 9 form on both sides the nodal domains 19 of a coupled oscillator system which, in preferred embodiments, is made operational by placing the resonating string section in the magnetic field of a permanent magnet 21. The electric excitation of a resonating string section 15 and the placement of permanent magnets 21 are known from the prior art and will not be explained further. Other methods for the excitation are also possible.

Following the excitation of resonating string section 15 in the direction of small flexural rigidity indicated by double arrow A in FIG. 2 and transverse to plane B, and because the elastic flaps 13 participate in the oscillation always in opposite phase, essentially standing elastic wave nodes are formed in the portion 19 adjoining the root portions 11 of elastic flaps 13 and measuring string 15. Transverse forces and moments introduced into the nodal domains 19 from the resonating string section 15 and the flaps 13, the latter being located next to and oscillating in opposite phase with the string section, largely cancel each other out, roughly analogous to a tuning fork. Consequently, coupling sections 9 which are contiguous to nodal domain 19 remain in their non-deflected state, regardless of whether attachment tabs 3 are clamped fast or held loosely. The uncoupling of the oscillations of the resonating string section 15 and of the two elastic flaps 13 in the nodal domains effects a largely optimized containment of the oscillatory energy and prevents the formation of interfering resonances caused by oscillations of the connecting elements (coupling sections 9, fastening elements 4) or by of nodal masses which are arranged symmetrically relative to the plane of the string section and contact the flaps from both sides and are used to isolate the string oscillation.

Strongly reducing the potential for interfering resonances in the ends of resonating string section 15, i.e., in its roots 11, has the effect that the attenuation of the string amplitude is of the order of no more than a few percent, and that, consequently, the oscillation has a high quality factor, resulting in exceptionally high accuracy with a small supply of energy.

The small and controlled energy intake, for its part, decreases the undesirable heat generation in the measuring apparatus.

In FIG. 4, the extreme positions of resonating string section 15 and of the four elastic flaps 13 are illustrated in exaggerated representation. In the triangularly shaped nodal domain 19 are situated the roots 11 in a line side by side, the nodes of the oscillation being located approximately at roots 11 close to the forward end of nodal domain 19. Consequently, the juncture of nodal domain 19 with coupling section 9 remains essentially unaffected, over a wide frequency range, from the deflections of elastic flaps 13 and of resonating string section 15.

In a preferred embodiment, measuring string 1 has the following proportional dimensions, wherein its length represents 550 parts. With a thickness s (in FIG. 2) of 2 parts, width b (FIG. 1) of resonating string section 15 is approximately 6 parts. The two elastic flaps 13 extend over a length of 30 parts each along resonating string section 15 and are spaced in parallel at a distance of 10 parts from resonating string section 15. The width c of the elastic flaps corresponds to 14 parts and is, accordingly, significantly wider than width b of resonating string section 15. Coupling section 9 is 6 parts wide, i.e., exceedingly narrow in comparison to the width of approximately 100 parts of attachment tabs 3.

Of course, a significantly different choice of dimensional relationships may be appropriate, depending on the purpose.

The significantly larger specific mass of elastic flaps 13 in comparison to the mass of resonating string section 15 together with the preferred geometric proportions have the effect that the amplitude of resonating string section 15 is larger than the amplitudes of elastic flaps 13, which is best seen from the slope angle relative to the plane containing attachment tabs 3 (see FIG. 4). In practice, the amplitude of resonating string section 15 is controlled through the excitation.

Measuring string 1 is preferably fabricated by etching, in order to achieve high accuracy relative to its symmetry. The process of etching not only makes high geometric accuracy achievable, but also produces exceptionally smooth, warp-free contours that lend themselves well to protective galvanic plating. This manufacturing process which also has other technical applications, offers the flexibility to readily and cost-effectively adapt the geometry of the measuring string to changing needs or to new types of balances, and also to make further refinements.

Figure 6:
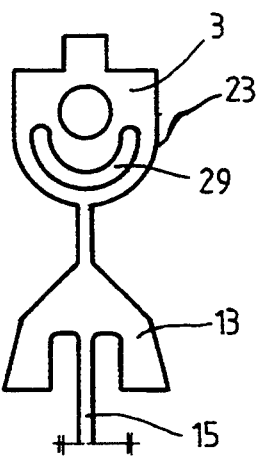
Figure 7:
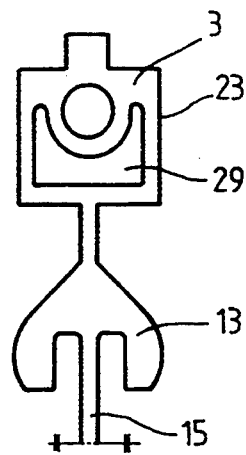

In another embodiment of the invention according to FIGS. 5 to 7, springs 23 are added to one end of coupling sections 9. The springs are part of the integrally formed measuring string 1 and, when springs 23 are coupled, e.g., to an elastic parallel-motion system, the combination acts as a system of parallel springs. The force conducted through the string may be significantly reduced depending on the spring constant of the monolithically integrated spring 23. In the case of a balance, a force reduction, e.g., by a factor as high as 300, is readily achievable. Thus, the resonating string section 15 can have correspondingly slighter dimensions in order to attain a higher resolution. At the same time, springs 23 acting as an elastic reference effect a significant suppression of inelastic side-effects (elastic after-effect, hysteresis) and thermal influences (temperature dependence of the modulus of elasticity). In addition, springs 23 help to isolate oscillations that could pass through nodal domain 19 into the coupling sections 9.

Springs 23, formed as reference springs in the embodiments according to FIGS. 5 to 7, are part of attachment tabs 3. As the direct and non-yielding connection of coupling sections 9 to the central, clamped portion of attachment tabs 3 is interrupted by an aperture or slit 29, a degree of axial elasticity is attained. Aperture 29 may follow the contours of attachment tab 3, preferably at an essentially constant distance, and be arc-shaped as in FIG. 6 or angular as in FIG. 7, or it may be in the form of a triangular opening as in FIG. 5.

Figure 8:
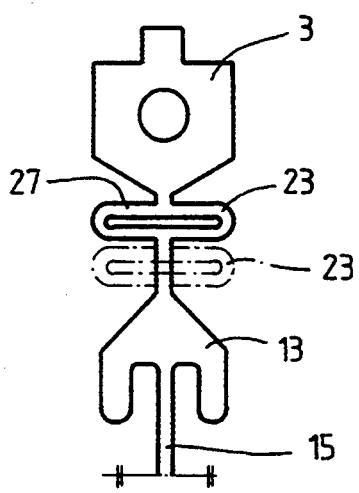
FIGS. 8 to 11 show further embodiments of the measuring string with ring-shaped springs incorporated into the coupling sections.
Figure 9:
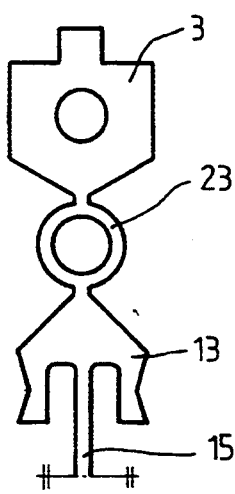
Figure 10:
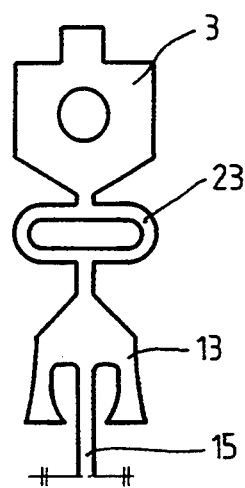
Figure 11:
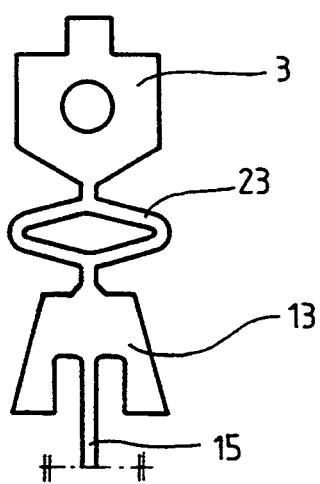
Figure 12:
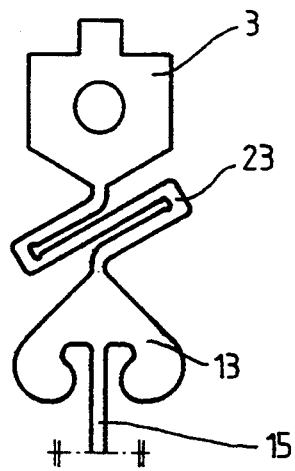
FIGS. 12 to 14 show further embodiments of the measuring string with springs in the shape of curved or rectangularly broken waves incorporated into the coupling sections.
Figure 13:
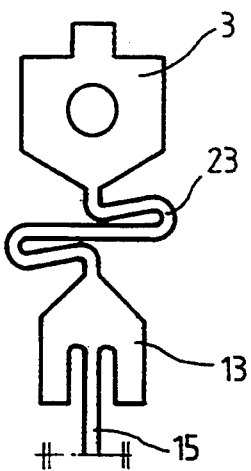
Figure 14:
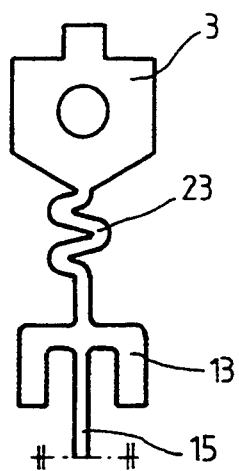

In the embodiments of the invention according to FIGS. 8 to 11, the springs are formed within the coupling sections 9 in the shape of closed-ring spring elements 23. Coupling sections of equal length (FIGS. 9, 11) or of different length (FIGS. 8, 10) act symmetrically on the spring elements. A soft elastic spring element 23 has a pair of closely spaced segments 27 oriented transverse to the coupling sections and connected with each other by semi-circular segments (FIG. 8). There may also be two springs in series incorporated in coupling section 9. FIG. 10 shows a similar embodiment which relative to its spring constant ranks between the circle-shaped spring element 23 of FIG. 9 and the element of FIG. 8. A rhomboid spring element 23 is shown in FIG. 11. Further embodiments are represented in FIGS. 12 to 14. Here, by virtue of their curved or angular meandering shape, the coupling sections themselves form the springs 23.

Figure 15:
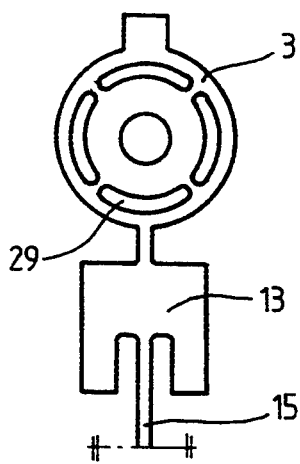
FIG. 15 shows another embodiment of the measuring string with a ring-shaped spring as part of the attachment tab.

Spring 23 in FIG. 15 is shaped for a particular distribution of the forces, where slots 29 are arranged symmetrically around the clamped portion at the center of attachment tab 3.

Figure 16:
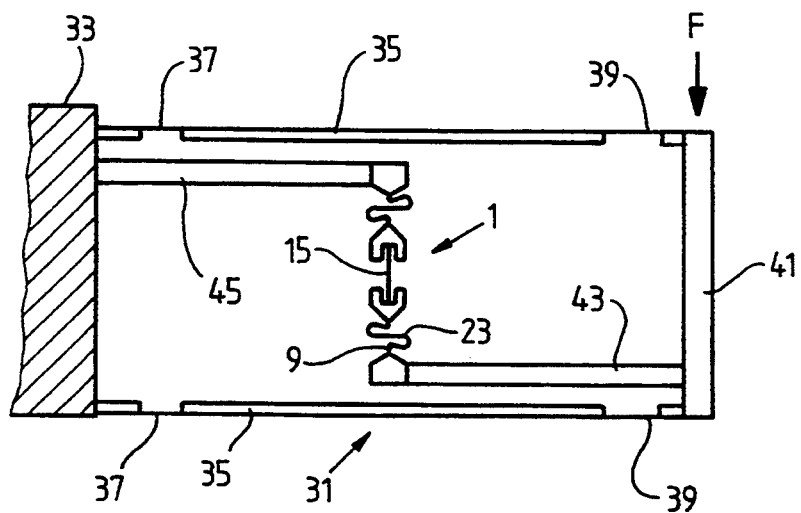
FIG. 16 is a schematic view of an example of mounting the measuring string.

FIG. 16 illustrates an example of mounting the measuring string 1 in an elastic parallel-motion linkage 31 in a balance. Two guide members 35 are attached through their flexure pivots 37, 39 to a console 33 and a load receptor 41, respectively. Load receptor 41 has a lower attachment holder 43 for measuring string 1. An upper attachment holder 45 is connected on the side of console 33. A force F acting on the load receptor is transmitted through the two springs 23 to measuring string 1.

The small horizontal displacement of load receptor 41 which occurs in the arcuate movement of the parallel-motion linkage, as well as a slight rotation of the lower attachment holder 43 under an asymmetric load, are absorbed by coupling sections 9, i.e., by springs 23, without causing a detrimental warping of measuring string 1.

The shape given to elastic flaps 13 may vary widely, as suggested by the examples shown in FIGS. 5 to 14.

The invention is not limited by the embodiments described above which are presented as examples only but can be modified in various ways within the scope of protection defined by the appended patent claims.

We claim:

1. A planar single-piece measuring string configured to oscillate in a direction perpendicular to a plane of rest of the measuring string, the measuring string comprising two attachment tabs, a resonating string section extending in a plane, and two coupling sections connecting the resonating string section to the attachment tabs, the resonating string section having two junctures connecting the resonating string section to the coupling sections, the junctures defining nodal domains of oscillation, the measuring string further comprising at each nodal domain two elastic flaps each having a side and a free end, the flaps being connected at the sides thereof to the nodal domains for participating in the oscillation of the resonating string section, the flaps extending parallel to a portion of the length and in the plane of the resonating string section, the free ends of the flaps being positioned opposite and spaced from each other, wherein the attachment tabs, the resonating string section, the two coupling sections and the flaps have the same thickness.

2. The measuring string according to claim 1, wherein the elastic flaps have a width at a middle thereof and the resonating string section has a width, and wherein the with at the middle of the elastic flaps is larger than the width of the resonating string section.

3. The measuring string according to claim 2, wherein the width of the resonating string section is larger than the thickness of the resonating string section.

4. The measuring string according to claim 1, wherein the measuring string is a chemically etched member.

5. The measuring string according to claim 1, wherein each nodal domain is essentially shaped as a triangle having three sides, wherein the two elastic flaps and one end of the resonating string section extend in line at one side of the triangle, and wherein the coupling section is attached to the triangle at an intersection of two other sides of the triangle.

6. The measuring string according to claim 1, comprising a clamped portion at a hole in each attachment tab, and further comprising a spring which is integrally formed in the measuring string and located between the clamped portion and the resonating string section.

7. The measuring string according to claim 6, wherein the spring is defined by an aperture in the attachment tab, the aperture having a shape following a contour of the attachment tab.

8. The measuring string according to claim 6, wherein each coupling section has a first end connected to the string and a second end connected to the attachment tab, and wherein the spring is positioned between the first and second ends within the coupling section.

9. The measuring string according to claim 8, wherein the spring is a closed ring having one of a round, flat and polygonal shape.

10. The measuring string according to claim 9, comprising two springs positioned in series within the coupling section.

11. The measuring string according to claim 6, wherein the springs have an undulating configuration.

12. The measuring string according to claim 6, wherein the springs have a meandering configurating.

13. The measuring string according to claim 1, wherein the elastic flaps are rectangular.

14. The measuring string according to claim 6, wherein each elastic flap has a width which decreases toward the free end of the elastic flap.

15. The measuring string according to claim 6, wherein each elastic flap has a width which increases toward the free end of the elastic flap.

16. A planar single-piece measuring string configured to oscillate in a direction perpendicular to a plane of rest of the measuring string, the measuring string comprising two attachment tabs, a resonating string section extending in a plane and having sides, and two coupling sections connecting the resonating string section to the attachment tabs, the resonating string section having two junctures connecting the resonating string section to the coupling sections, the junctures defining nodal domains of oscillation, the measuring string further comprising at each nodal domain a fork-shaped elastic member having prongs, the elastic members being connected to the nodal domains for participating in the oscillation of the resonating string section, the prongs extending parallel to a portion of the length and in the plane of the resonating string section, the prongs having free ends, the free ends of the prongs being positioned opposite and spaced from each other, wherein the attachment tabs, the resonating string section, the two coupling sections and the prongs have the same thickness.

* * * * *